United States Patent
Oishi et al.

(10) Patent No.: US 9,612,505 B2
(45) Date of Patent: Apr. 4, 2017

(54) FOCAL-PLANE SHUTTER AND OPTICAL APPARATUS

(71) Applicant: SEIKO Precision Inc., Matsudo-shi, Chiba (JP)

(72) Inventors: Seiichi Oishi, Matsudo (JP); Shoichi Tokura, Matsudo (JP)

(73) Assignee: SEIKO PRECISION INC., Chiba (JP)

( * ) Notice: Subject to any disclaimer, the term of this patent is extended or adjusted under 35 U.S.C. 154(b) by 0 days.

(21) Appl. No.: 15/221,145

(22) Filed: Jul. 27, 2016

(65) Prior Publication Data

US 2017/0045801 A1 Feb. 16, 2017

(30) Foreign Application Priority Data

Aug. 10, 2015 (JP) ................................ 2015-158020

(51) Int. Cl.
*G03B 9/08* (2006.01)
*G03B 9/36* (2006.01)

(52) U.S. Cl.
CPC ..................................... *G03B 9/36* (2013.01)

(58) Field of Classification Search
USPC ........................................................ 396/456
See application file for complete search history.

(56) References Cited

U.S. PATENT DOCUMENTS

| 5,051,765 | A | * | 9/1991 | Yoshizaki | G03B 17/04 396/349 |
| 8,356,949 | B2 | * | 1/2013 | Takahashi | G03B 9/36 396/456 |
| 2002/0114628 | A1 | * | 8/2002 | Nakano | G03B 9/18 396/484 |
| 2002/0197078 | A1 | * | 12/2002 | Toyoda | G03B 9/18 396/484 |
| 2003/0161624 | A1 | * | 8/2003 | Toyoda | G03B 9/40 396/487 |
| 2008/0267615 | A1 | * | 10/2008 | Nishio | G03B 9/36 396/453 |

FOREIGN PATENT DOCUMENTS

JP     2011-170226 A     9/2011

* cited by examiner

*Primary Examiner* — Rodney Fuller
(74) *Attorney, Agent, or Firm* — Brinks Gilson & Lione

(57) ABSTRACT

A focal-plane shutter capable of preventing deterioration of the quality of a captured image is provided. A focal-plane shutter includes a base plate having an opening, a rear curtain that moves between an open position where the opening is open and a closed position where the opening is closed to allow the opening to be open and closed, and a first cushioning member that comes into contact with the rear curtain, and the rear curtain has a first protrusion that is located outside the opening, protrudes in a first direction from the open position toward the closed position, and comes into contact with the first cushioning member when the rear curtain moves from the open position to the closed position.

9 Claims, 6 Drawing Sheets

FOCAL-PLANE SHUTTER AND OPTICAL APPARATUS

RELATED APPLICATIONS

This application claims priority under 35 U.S.C. §119 to Japanese Patent Application No. 2015-158020 filed on Aug. 10, 2015, the entire content of which is hereby incorporated by reference.

BACKGROUND OF THE INVENTION

Field of the Invention

The present invention relates to a focal-plane shutter and an optical apparatus.

Background Art

An optical apparatus, for example, a digital camera and a still camera, employs a focal-plane shutter. In the operation of the focal-plane shutter, a curtain including a front curtain and a rear curtain is moved between an open position where an opening of a substrate is open and a closed position where the opening is closed. The focal-plane shutter includes a cushioning member that comes into contact with the curtain in a curtain movement end position to stop the curtain. The cushioning member, which comes into contact with the curtain in the curtain movement end position, reduces the impact produced when the curtain moving at high speed stops.

For example, a blade drive apparatus (focal-plane shutter) described in JP-A-2011-170226 includes a substrate having an opening, a blade that moves between a position where the blade retracts from the opening and a position where the blade overlaps with at least part of the opening, and a cushioning member that has a loop-like shape, has elasticity, comes into contact with the blade at an end of the blade movement range, and is so deformable that the loop-like shape is distorted when the cushioning member comes into contact with the blade.

JP-A-2011-170226 states that the blade drive apparatus can suppress a bounce of the blade that occurs when the blade comes into contact with the cushioning member.

When the curtain and the cushioning member come into contact with each other, foreign matter may be produced in some cases due to peel-off of a film coated on the curtain or wear of the cushioning member. When the foreign matter intrudes into the opening of the substrate, the quality of a captured image could undesirably deteriorate.

SUMMARY OF THE INVENTION

The invention provides a focal-plane shutter and an optical apparatus capable of preventing deterioration of the quality of a captured image.

A focal-plane shutter according to the invention includes a substrate having an opening, a curtain that moves between an open position where the opening is open and a closed position where the opening is closed to allow the opening to be open and closed, and a cushioning member that comes into contact with the curtain, and the curtain has a protrusion that is located outside the opening, protrudes in a first direction from the open position toward the closed position, and comes into contact with the cushioning member when the curtain moves from the open position to the closed position.

According to the invention, since the curtain has the protrusion, which is located outside the opening of the substrate, protrudes in the first direction from the open position toward the closed position, and comes into contact with the cushioning member, the cushioning member can be provided in a position separate from the opening of the substrate. Therefore, even when a foreign matter is produced due to the contact between the protrusion and the cushioning member, a situation in which the foreign matter intrudes into the opening of the substrate can be avoided. Deterioration of the quality of a captured image can therefore be avoided.

Further, since the curtain is so configured that the protrusion, which comes into contact with the cushioning member, is located outside the opening, even when an impact mark is formed in the curtain due to the contact with the cushioning member, a situation in which the impact mark traverses the opening can be avoided. Therefore, a situation in which the impact mark is caught by the inner circumferential edge of the opening, what is called a stuck blade, when the curtain moves can be avoided, and a situation in which the impact mark causes poor light exposure so that the quality of a captured image deteriorates can be avoided.

In the focal-plane shutter described above, it is desirable that the curtain includes a front curtain and a rear curtain, and that the rear curtain is provided with the protrusion.

In general, the speeds at which the curtains travel when they move from the open position to the closed position are so set that the rear curtain travels faster than the front curtain. Therefore, in a case where the rear curtain is caused to come into contact with the cushioning member, a foreign matter is more likely to be produced. According to the present embodiment, since the rear curtain is provided with the protrusion, even in the case where a foreign matter tends to be produced due to the contact between the curtain and the cushioning member, a situation in which the foreign matter intrudes into the opening of the substrate can be effectively avoided. Deterioration of the quality of a captured image can therefore be avoided.

In the focal-plane shutter described above, the front curtain desirably comes into contact with the cushioning member when the front curtain moves from the closed position to the open position.

According to the invention, the cushioning member can be used as a member that reduces the impact produced when the front curtain moves from the closed position to the open position and stops there. Therefore, an increase in the number of parts can be avoided, as compared with a case where a cushioning member is provided for each of the front curtain and the rear curtain, whereby the focal-plane shutter can be manufactured at low cost.

In the focal-plane shutter described above, it is desirable that the curtain includes a front curtain and a rear curtain, and that the front curtain is provided with the protrusion.

According to the invention, in a case where the front curtain is moved from the open position to the closed position particularly after image capturing end to return to the initial position or in a configuration in which light exposure is performed when the front curtain is moved from the open position to the closed position as well as the case described above, the cushioning member can reduce the impact produced when the front curtain, which moves at high speed, stops, and a situation in which a foreign matter produced due to the contact between the protrusion of the front curtain and the cushioning member intrudes into the opening of the substrate can be avoided.

In the focal-plane shutter described above, the protrusion is desirably provided at an end portion of the curtain along a second direction perpendicular to the first direction.

According to the invention, the protrusion, which is provided at an end portion of the curtain along the second direction, is allowed to be located outside the opening and protrude in the first direction. Therefore, even when an impact mark is formed in the protrusion, a stuck blade or the situation in which the impact mark is caught by the inner circumferential edge of the opening can be avoided.

In the focal-plane shutter described above, a length of the protrusion along the first direction is desirably greater than a length of the protrusion along the second direction perpendicular to the first direction.

According to the invention, the protrusion can be readily bent when force in the first direction acts on the protrusion. Therefore, when the protrusion comes into contact with the cushioning member and receives force in the first direction, the protrusion can reduce the impact produced when the curtain stops. Therefore, the impact produced when the curtain stops can be reliably reduced, and the impact applied to the cushioning member can also be reduced, whereby a situation in which a foreign matter is produced due to the contact between the protrusion and the cushioning member can be avoided.

In the focal-plane shutter described above, it is desirably that the curtain has a plurality of blades that unfold in the state in which the opening is closed, and that the protrusion is provided as part of one of the plurality of blades or a first blade that moves over a longest distance when the curtain moves from the open position to the closed position.

According to the invention, since the kinetic energy of the blades created when the curtain moves from the open position to the closed position is maximized in the first blade, providing the first blade with the protrusion can effectively reduce the impact produced when the curtain stops and avoid deterioration of the quality of a captured image.

In the focal-plane shutter described above, it is desirable that the curtain has a plurality of blades that unfold in the state in which the opening is closed, and that the protrusion is provided as part of one of the plurality of blades or a second blade that moves over a second longest distance when the curtain moves from the open position to the closed position.

In a configuration in which the first blade comes into contact with the cushioning member, the impact applied to the first blade when the curtain stops is reduced by the cushioning member. On the other hand, as for the second blade, the kinetic energy of which created when the curtain moves from the open position to the closed position is smaller than that of the first blade but greater than that of the other blades, the impact applied to the second blade when the curtain stops is not reduced, and the second blade is bent in some cases.

According to the invention, in which the second blade is provided with the protrusion, the cushioning member provided in a position separate from the opening of the substrate can reduce the impact applied to the second blade when the curtain stops. Therefore, the bending of the second blade can be avoided, and deterioration of the quality of a captured image can be suppressed.

An optical apparatus according to the invention includes any of the focal-plane shutters described above.

According to the invention, an optical apparatus that suppresses deterioration of the quality of a captured image can be provided.

According to the invention, since the curtain has the protrusion, which is located outside the opening of the substrate, protrudes in the first direction from the open position toward the closed position, and comes into contact with the cushioning member, the cushioning member can be provided in a position separate from the opening of the substrate. Therefore, even when a foreign matter is produced due to the contact between the protrusion and the cushioning member, a situation in which the foreign matter intrudes into the opening of the substrate can be avoided. Deterioration of the quality of a captured image can therefore be avoided.

Further, since the curtain is so configured that the protrusion, which comes into contact with the cushioning member, is located outside the opening, even when an impact mark is formed in the curtain due to the contact with the cushioning member, a situation in which the impact mark traverses the opening can be avoided. Therefore, a situation in which the impact mark is caught by the inner circumferential edge of the opening, what is called a stuck blade, when the curtain moves can be avoided, and a situation in which the impact mark causes poor light exposure so that the quality of a captured image deteriorates can be avoided.

DETAILED DESCRIPTION OF THE INVENTION

Embodiments of the invention will be described below with reference to the drawings.

First Embodiment

An optical apparatus 1 and a focal-plane shutter 10 according to a first embodiment will first be described.
(Optical Apparatus)

Figure 1:
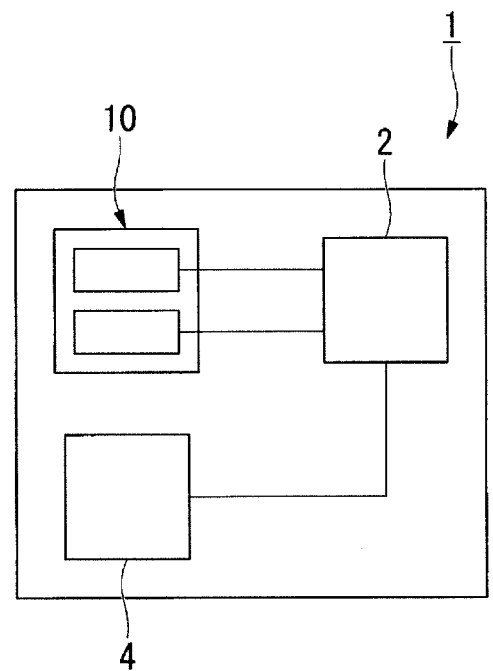
FIG. 1 is a block diagram of an optical apparatus according to a first embodiment.

FIG. 1 is a block diagram of the optical apparatus according to the first embodiment.

The optical apparatus 1 is, for example, a digital camera or a still camera and includes a controller 2, an imaging device 4, and the focal-plane shutter 10, as shown in FIG. 1.

The controller 2 controls the overall action of the optical apparatus 1 and includes a CPU (central processing unit), a ROM (read only memory), a RAM (random access memory), and other components. The controller 2 controls the action of the focal-plane shutter 10, which will be described later.

The imaging device 4 is, for example, a CCD (charge coupled device) or a CMOS (complementary metal oxide semiconductor) image sensor and converts a subject image formed by light into an electric signal.

The optical apparatus 1 further includes, although not shown in FIG. 1, a lens and other components for adjusting the focal length.

(Focal-Plane Shutter)

Figure 2:
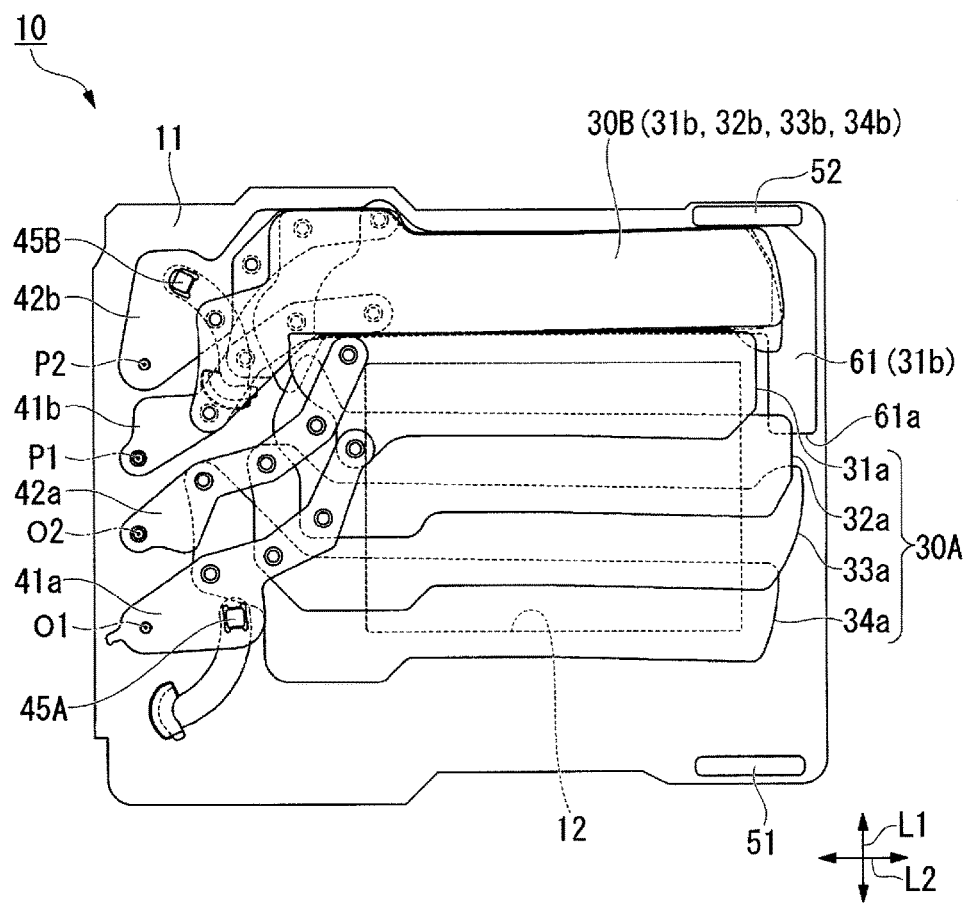
FIG. 2 is a front view of a focal-plane shutter according to the first embodiment and shows an initial state.
Figure 3:
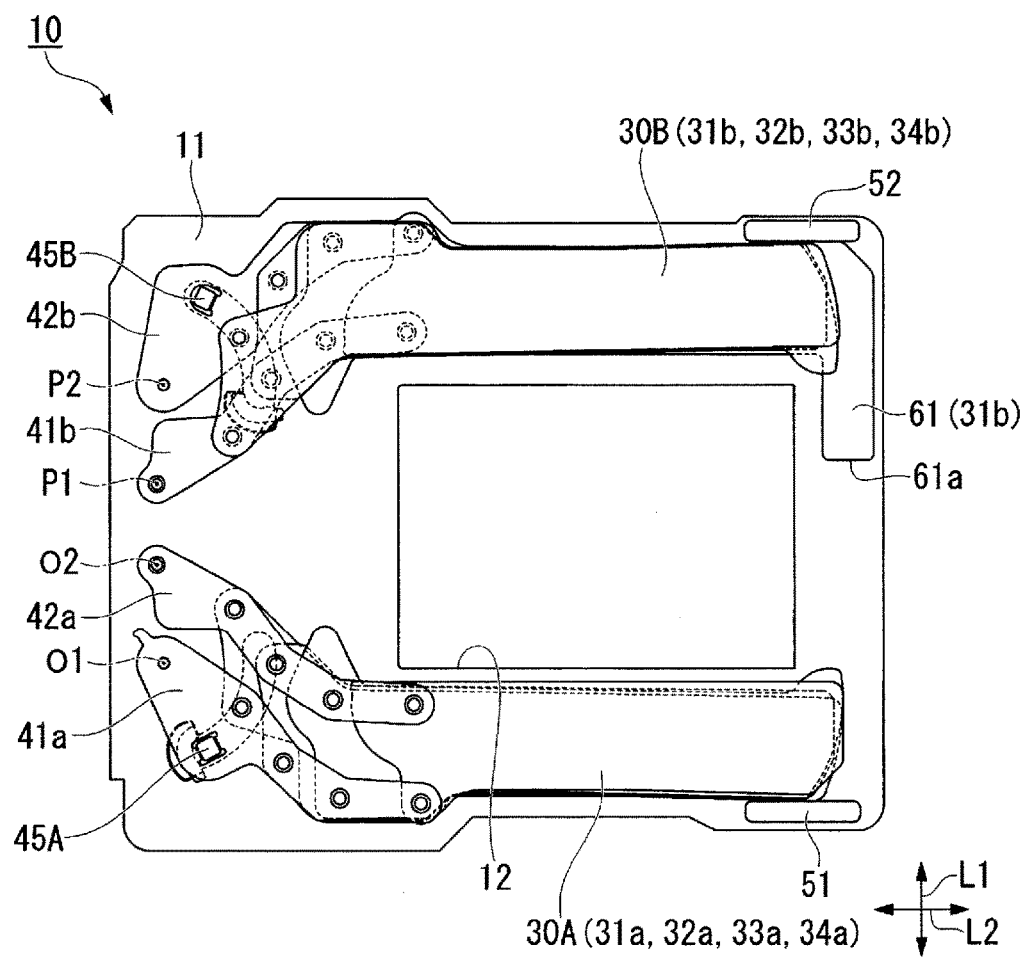
FIG. 3 is a front view of the focal-plane shutter according to the first embodiment and shows a state during light exposure.
Figure 4:
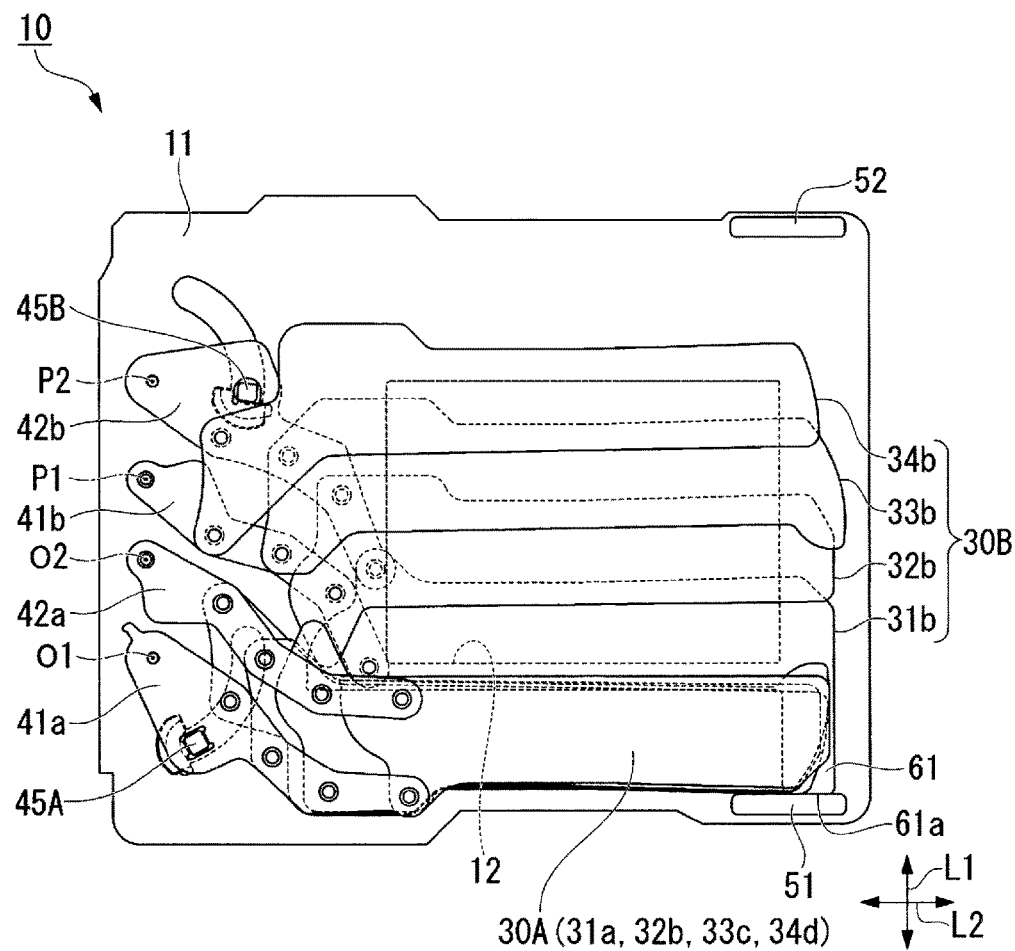
FIG. 4 is a front view of the focal-plane shutter according to the first embodiment and shows a state immediately after the light exposure ends.

FIGS. 2 to 4 are front views of the focal-plane shutter according to the first embodiment. FIG. 2 shows an initial state (charged state). FIG. 3 shows a state during light exposure. FIG. 4 shows a state immediately after the light exposure ends (light exposure end state).

The focal-plane shutter 10 primarily includes a base plate 11 (substrate), front curtain drive arms 41a and 42a and rear curtain drive arms 41b and 42b, which are swingably supported by the base plate 11, a front curtain 30A (curtain), which is driven by the front curtain drive arms 41a and 42a, a rear curtain 30B (curtain), which is driven by the rear curtain drive arms 41b and 42b, a first cushioning member 51, which comes into contact with the front curtain 30A, and a second cushioning member 52, which comes into contact with the rear curtain 30B, as shown in FIG. 2.

The base plate 11 is made of a synthetic resin and has a rectangular opening 12. Among the members that form the focal-plane shutter 10, the base plate 11 is a member arranged in a position closest to lenses in the optical apparatus 1.

A blade receiving plate that is not shown is attached to the base plate 11. The blade receiving plate is so attached to the base plate 11 that the front curtain 30A, the rear curtain 30B, the front curtain drive arms 41a and 42a, the rear curtain drive arms 41b and 42b, and other components are accommodated between the blade receiving plate and the base plate 11. The blade receiving plate is made, for example, of a synthetic resin and has a rectangular opening. The opening of the blade receiving plate is so formed as to roughly coincide with the opening 12 of the base plate 11 in the front view.

A partitioning plate that is not shown is so arranged between the base plate 11 and the blade receiving plate (not shown) as to extend along the base plate 11 and the blade receiving plate. The partitioning plate is made of a synthetic resin, for example, PET (polyethylene terephthalate), and has a rectangular opening. The opening of the partitioning plate is so formed as to roughly coincide with the opening 12 of the base plate 11 and the opening of the blade receiving plate in the front view.

Each of the front curtain 30A and the rear curtain 30B moves between an open position where the opening 12 is entirely open and a closed position where the opening 12 is entirely closed so as to allow the opening 12 to be open and closed (see FIGS. 2 to 4). FIG. 2 shows a case where the front curtain 30A is located in the closed position and the rear curtain 30B is located in the open position. FIG. 3 shows a case where both the front curtain 30A and the rear curtain 30B are located in the open position. FIG. 4 shows a case where the front curtain 30A is located in the open position and the rear curtain 30B is located in the closed position. The front curtain 30A and the rear curtain 30B are so provided in the state in which they are both located in the open position that the front curtain 30A is located on one side of the opening 12 in the widthwise direction thereof and the rear curtain 30B is located on the other side (see FIG. 3).

The front curtain 30A is disposed between the blade receiving plate (not shown) and the partitioning plate (not shown). The front curtain 30A includes blades 31a to 34a. The blades 31a to 34a unfold in the closed position and retract in the open position with the blades 31a to 34a layered on each other. In the closed position, the blades 31a to 34a are arranged in this order from the downstream side to the upstream side in the direction in which the front curtain 30A moves when it moves from the open position to the closed position (hereinafter referred to as "when front curtain unfolds" in some cases). That is, the distance over which a blade moves when the front curtain 30A unfolds increases in the order of the blades 31a to 34a (see the movement from the state in FIG. 4 to the state in FIG. 2).

The rear curtain 30B is disposed between the base plate 11 and the partitioning plate (not shown). The rear curtain 30B includes blades 31b to 34b. The blades 31b to 34b unfold in the closed position and retract in the open position with the blades 31b to 34b layered on each other. In the closed position, the blades 31b to 34b are arranged in this order from the downstream side to the upstream side in the direction in which the rear curtain 30B moves when it moves from the open position to the closed position (hereinafter referred to as "when rear curtain unfolds" in some cases). That is, the distance over which a blade moves when the rear curtain 30B unfolds increases in the order of the blades 31b to 34a (see the movement from the state in FIG. 3 to the state in FIG. 4).

Each of the blades 31a to 34a and 31b to 34b is made of a synthetic resin and so formed as to be thin. The blades 31a to 34a and 31b to 34b extend along the direction perpendicular to the direction from the open position toward the closed position. The direction in which the blades 31a to 34a move from the open position toward the closed position coincides with the direction in which the blades 31b to 34b move from the open position toward the closed position. In the following description, the direction in which the blades 31a to 34a and 31b to 34b move from the open position toward the closed position is defined as a first direction L1. Further, the direction perpendicular to the first direction L1 is defined as a second direction L2. The first direction L1 coincides with the widthwise direction of the opening 12, and the second direction L2 coincides with the longitudinal direction of the opening 12. Further, the direction perpendicular to the first direction L1 and the second direction L2 coincides with the direction in which the opening 12 passes through the base plate 11 (optical axis direction).

The blades 31a to 34a are connected to the front curtain drive arms 41a and 42a. The front curtain drive arms 41a and 42a are disposed between the blade receiving plate (not shown) and the partitioning plate (not shown). Each of the front curtain drive arms 41a and 42a is formed of a thin plate made of a metal so that the strength thereof is maintained. A base end portion of the front curtain drive arm 41a is so supported by the base plate 11 as to be swingable around a swing center O1. A base end portion of the front curtain drive arm 42a is so supported by the base plate 11 as to be swingable around a swing center O2. The front curtain drive arm 42a is arranged in a position shifted from the front curtain drive arm 41a toward the other side in the first direction L1. The swing centers O1 and O2 are provided in positions shifted from the blades 31a to 34a toward one side in the second direction L2.

The blade 31a, specifically, one end portion thereof along the second direction L2 is rotatably connected to front end portions of the front curtain drive arms 41a and 42a. The blade 32a, specifically, one end portion thereof along the second direction L2 is rotatably connected to the front curtain drive arms 41a and 42a, specifically, portions thereof shifted toward the base end thereof from the portions where the blade 31a is connected thereto. The blade 33a, specifically, one end portion thereof along the second direction L2 is rotatably connected to the front curtain drive arms 41a and 42a, specifically, portions thereof shifted toward the base end thereof from the portions where the blade 32a is connected thereto. The blade 34a, specifically, one end portion thereof along the second direction L2 is rotatably connected to the front curtain drive arms 41a and 42a, specifically, portions thereof shifted toward the base end thereof from the portions where the blade 33a is connected thereto. Each of the blades 31a to 34a, along with the front curtain drive arms 41a and 42a, functions as a parallel link mechanism.

The blades 31b to 34b are connected to the rear curtain drive arms 41b and 42b, as shown in FIG. 4. The rear curtain drive arms 41b and 42b are disposed between the base plate 11 and the partitioning plate (not shown). Each of the rear curtain drive arms 41b and 42b is formed of a thin plate made of a metal so that the strength thereof is maintained, as in the case of the front curtain drive arms 41a and 42a. A base end portion of the rear curtain drive arm 41b is so supported by the base plate 11 as to be swingable around a swing center P1. A base end portion of the rear curtain drive arm 42b is so supported by the base plate 11 as to be swingable around a swing center P2. The rear curtain drive arm 41b is arranged in a position shifted from the rear curtain drive arm 42b toward the one side in the first direction L1. The swing centers P1 and P2 are provided in positions shifted from the blades 31b to 34b toward the one side in the second direction L2.

The blade 31b (first blade), specifically, one end portion thereof along the second direction L2 is rotatably connected to front end portions of the rear curtain drive arms 41b and 42b. The blade 32b, specifically, one end portion thereof along the second direction L2 is rotatably connected to the rear curtain drive arms 41b and 42b, specifically, portions thereof shifted toward the base end thereof from the portions where the blade 31b is connected thereto. The blade 33b, specifically, one end portion thereof along the second direction L2 is rotatably connected to the rear curtain drive arms 41b and 42b, specifically, portions thereof shifted toward the base end thereof from the portions where the blade 32b is connected thereto. The blade 34b, specifically, one end portion thereof along the second direction L2 is rotatably connected to the rear curtain drive arms 41b and 42b, specifically, portions thereof shifted toward the base end thereof from the portions where the blade 33b is connected thereto. Each of the blades 31b to 34b, along with the rear curtain drive arms 41b and 42b, functions as a parallel link mechanism.

The blade 31b has a first protrusion 61, which protrudes from the end portion (front end portion) of the blade 31b on the other side in the second direction L2 toward the one side in the first direction L1 (side toward which the blade 31b moves from the open position to the closed position). The first protrusion 61 is formed in a rectangular shape. The first protrusion 61 is so formed as to be located outside the opening 12 and shifted from the opening 12 toward the other side in the second direction L2 when viewed in the direction in which the opening 12 passes through the base plate 11. The length of the first protrusion 61 along the first direction L1 is greater than the length of the first protrusion 61 along the second direction L2.

The base plate 11 is provided with a front curtain drive lever 45A for driving the front curtain drive arm 41a and a rear curtain drive lever 45B for driving the rear curtain drive aim 42b. Each of the front curtain drive lever 45A and the rear curtain drive lever 45B is so supported by the base plate 11 as to be swingable over a predetermined range. Specifically, the front curtain drive lever 45A is supported as to be swingable around an axis formed through the base plate 11, and the front curtain drive lever 45A is inserted into a groove formed in the base plate 11 so that the swingable range of the front curtain drive lever 45A is restricted. The same holds true for the rear curtain drive lever 45B.

Each of the front curtain drive lever 45A and the rear curtain drive lever 45B is caused to swing by a drive source that is not shown. The drive source can, for example, be a driver that drives the drive levers 45A and 45B on the basis of an effect produced by an electromagnet and a spring or any other urging member or an electromagnetic actuator including a rotor, a stator, and a coil.

The front curtain drive arm 41a is connected to the front curtain drive lever 45A. The rear curtain drive arm 42b is connected to the rear curtain drive lever 45B. When the front curtain drive lever 45A swings, the front curtain drive arm 41a swings and moves the front curtain 30A. Similarly, when the rear curtain drive lever 45B swings, the rear curtain drive arm 42b swings and moves the rear curtain 30B.

The first cushioning member 51 is arranged between the base plate 11 and the blade receiving plate (not shown). The first cushioning member 51 is so arranged as to be shifted from the front curtain 30A located in the open position toward the one side in the first direction L1. The first cushioning member 51 is formed in a box-like shape extending along the second direction L2. The first cushioning member 51 is so formed as to be elastically deformable. The first cushioning member 51 is formed of an elastic member made, for example, of a nitrile rubber or urethane foam material. When the front curtain 30A moves from the closed position to the open position and stops there, a side edge portion of a front end portion of each of the blades 31a to 34a, specifically, the side edge portion on the one side in the first direction L1 comes into contact with the first cushioning member 51. Further, when the rear curtain 30B moves from the open position to the closed position and stops there, an end portion of the first protrusion 61, specifically, an end portion 61a along the first direction L1 (front end portion 61a) comes into contact with the first cushioning member 51. In the present embodiment, the front end portion 61a of the first protrusion 61 of the blade 31b located in the closed position comes into contact with the first cushioning member 51. The first cushioning member 51 is fixed to the base plate 11, for example, with a bonding agent or an adhesive tape. The first cushioning member 51 may instead be fixed to the base plate 11 by press-fitting the first cushioning member 51 into a recess or any other portion formed in the base plate 11.

The second cushioning member 52 is arranged between the base plate 11 and the blade receiving plate (not shown). The second cushioning member 52 is so arranged as to be shifted from the rear curtain 30B located in the open position toward the other side in the first direction L1 (see FIG. 2). The second cushioning member 52 is formed in a box-like shape extending along the second direction L2. The second cushioning member 52 is so formed as to be elastically deformable, as in the case of the first cushioning member 51. When the rear curtain 30B moves from the closed position to the open position and stops there, a side edge portion of a front end portion of each of the blades 31b to 34b, specifically, the side edge portion on the other side in the first direction L1 comes into contact with the second cushioning member 52. The second cushioning member 52 is fixed to the base plate 11, for example, with a bonding agent or an adhesive tape, as in the case of the first cushioning member 51.

The action and effect of the focal-plane shutter 10 according to the present embodiment will be described below.

The focal-plane shutter 10 is so configured in the initial state that the front curtain 30A is located in the closed position and the rear curtain 30B is located in the open position.

When a release button of the optical apparatus 1 is pressed in image capturing, the front curtain drive lever 45A rotates clockwise, as shown in FIG. 3. As a result, the state in which the front curtain 30A opens the opening 12 is achieved. On the other hand, the state in which the rear curtain 30B has opened the opening 12 is maintained for a predetermined period. As a result, the state in which the opening 12 is open (light exposure state) is achieved.

After a predetermined period has elapsed since the release button was pressed, the rear curtain drive lever 45B rotates clockwise. As a result, the rear curtain 30B moves from the open position to the closed position to close the opening 12, as shown in FIG. 4. In this process, when the rear curtain drive lever 45B comes into contact with the end of the groove which is formed in the base plate 11 and into which the rear curtain drive lever 45B is inserted, the blade 31b, which is the front blade in the moving direction of the rear curtain 30B, moves in accordance with the law of inertia and could overshoot. The blade 31b, however, has the first protrusion 61, which comes into contact with the first cushioning member 51 when the rear curtain 30B is located in the closed position. The first protrusion 61 therefore prevents the blade 31b from overshooting. Single image capturing thus ends.

A set lever that is not shown then rotates the front curtain drive lever 45A and the rear curtain drive lever 45B counterclockwise. As a result, the front curtain 30A unfolds to close the opening 12, and the rear curtain 30B retracts to open the opening 12, so that the initial state shown in FIG. 2 is restored.

As described above, according to the present embodiment, since the rear curtain 30B has the first protrusion 61, which is located outside the opening 12 of the base plate 11, protrudes in the first direction L1, and comes into contact with the first cushioning member 51, the first cushioning member 51 can be provided in a position separate from the opening 12 of the base plate 11. Therefore, even when a foreign matter is produced due to the contact between the first protrusion 61 and the first cushioning member 51, a situation in which the foreign matter intrudes into the opening 12 of the base plate 11 can be avoided. Deterioration of the quality of a captured image can therefore be avoided.

Further, since the rear curtain 30B is so configured that the first protrusion 61, which comes into contact with the first cushioning member 51, is located outside the opening 12, even when an impact mark is formed in the blade 31b of the rear curtain 30B due to the contact with the first cushioning member 51, a situation in which the impact mark traverses the opening 12 can be avoided. Therefore, a situation in which the impact mark is caught by the inner circumferential edge of the opening 12, what is called a stuck blade, when the rear curtain 30B moves can be avoided, and a situation in which the impact mark causes poor light exposure so that the quality of a captured image deteriorates can be avoided.

In general, the speeds at which the curtains travel when they move from the open position to the closed position are so set that the rear curtain 30B travels faster than the front curtain 30A. Therefore, in a case where the rear curtain 30B is caused to come into contact with the first cushioning member 51, a foreign matter is more likely to be produced. According to the present embodiment, since the rear curtain 30B is provided with the first protrusion 61, even in the case where a foreign matter tends to be produced due to the contact between the blade 31b of the rear curtain 30B and the first cushioning member 51, a situation in which the foreign matter intrudes into the opening 12 of the base plate 11 can be effectively avoided. Deterioration of the quality of a captured image can therefore be avoided.

Further, since the front curtain 30A comes into contact with the first cushioning member 51 when the front curtain 30A moves from the closed position to the open position, the first cushioning member 51 can be used as a member that reduces the impact produced when the front curtain 30A moves from the closed position to the open position and stops there. Therefore, an increase in the number of parts can be avoided, as compared with a case where a cushioning member is provided for each of the front curtain 30A and the rear curtain 30B, whereby the focal-plane shutter 10 can be manufactured at low cost.

The first protrusion 61, which is provided on the other side in the second direction L2, is allowed to be located outside the opening 12 and protrude in the first direction L1. Therefore, even when an impact mark is formed in the first protrusion 61, a stuck blade or the situation in which the impact mark is caught by the inner circumferential edge of the opening 12 can be avoided.

Since the length of the first protrusion 61 along the first direction L1 is greater than the length thereof along the second direction L2, the first protrusion 61 can be readily bent when force in the first direction L1 acts on the first protrusion 61. Therefore, when the first protrusion 61 comes into contact with the first cushioning member S1 and receives force in the first direction L1, the first protrusion 61 can reduce the impact produced when the rear curtain 30B stops. Therefore, the impact produced when the rear curtain 30B stops can be reliably reduced, and the impact applied to the first cushioning member S1 can also be reduced, whereby a situation in which a foreign matter is produced due to the contact between the first protrusion 61 and the first cushioning member 51 can be avoided.

The first protrusion 61 is provided as part of one of the blades 31b to 34b of the rear curtain 30B, specifically, the blade 31b, which moves over the longest distance when the rear curtain 30B moves from the open position to the closed position. Since the kinetic energy of the blades 31b to 34b created when the rear curtain 30B moves from the open position to the closed position is maximized in the blade 31b, providing the blade 31b with the first protrusion 61 can effectively reduce the impact produced when the rear curtain 30B stops and avoid deterioration of the quality of a captured image.

Since the optical apparatus 1 according to the present embodiment includes the focal-plane shutter 10, deterioration of the quality of a captured image can be avoided.

Second Embodiment

A focal-plane shutter 110 according to a second embodiment will next be described.

Figure 5:
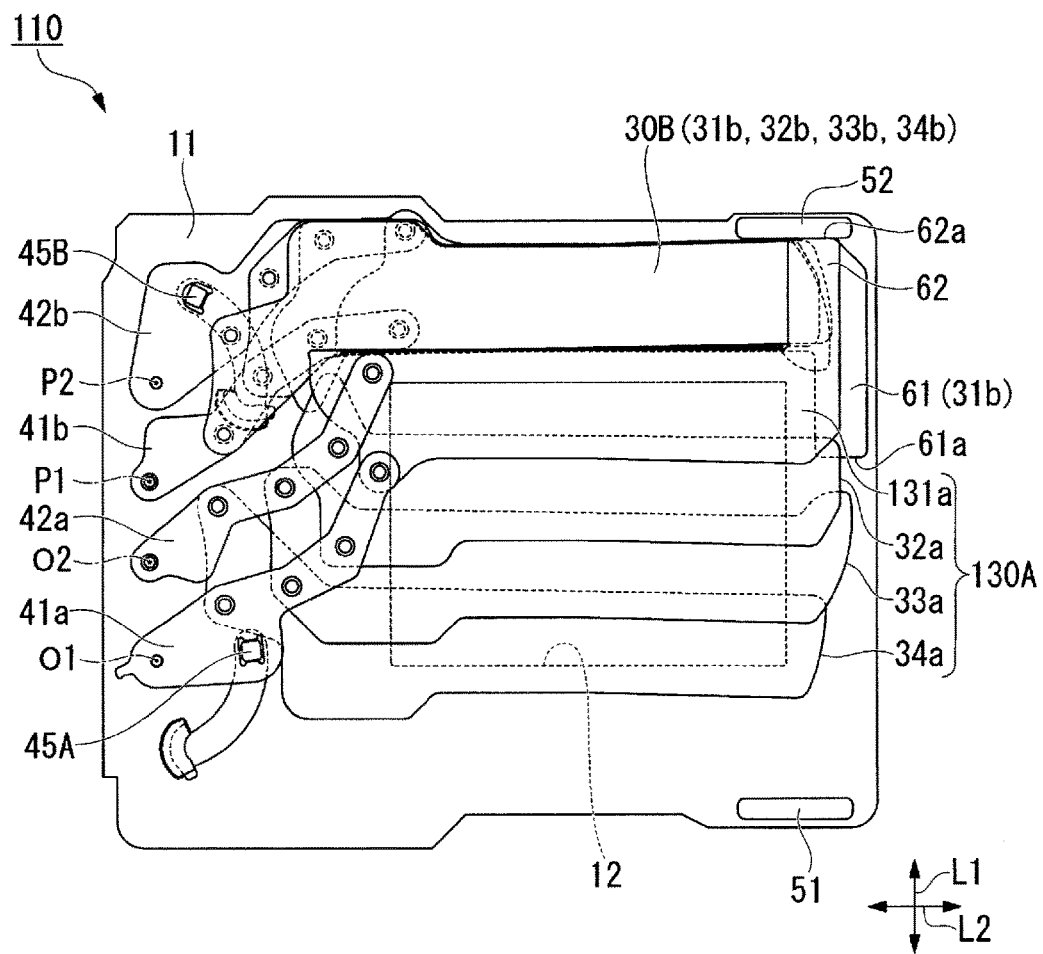
FIG. 5 is a front view of a focal-plane shutter according to a second embodiment and shows an initial state.

FIG. 5 is a front view of the focal-plane shutter according to the second embodiment and shows an initial state (charged state).

The second embodiment shown in FIG. 5 differs from the first embodiment shown in FIG. 2 in that a blade 131a (first blade) of a front curtain 130A (curtain) includes a second protrusion 62, which comes into contact with the second cushioning member 52 when the front curtain 130A unfolds.

The same configurations as those in the first embodiment shown in FIG. 2 have the same reference characters and will not be described in detail.

Among the blades 131a and 32a to 34a of the front curtain 130A, the blade 131a is arranged, in a state in which the front curtain 130A has unfolded, on the most downstream side in the direction in which the front curtain 130A moves when it unfolds, as shown in FIG. 5. Among the blades 131a and 32a to 34a of the front curtain 130A, the blade 131a moves over the longest distance when the front curtain 130A unfolds.

The blade 131a has the second protrusion 62, which protrudes from an end portion of the blade 131a on the other side in the second direction L2 (front end portion) toward the other side in the first direction L1 (side toward which the blade 131a moves from the open position to the closed position). The second protrusion 62 is formed in a rectangular shape. The second protrusion 62 is so formed as to be located outside the opening 12 and shifted from the opening 12 toward the other side in the second direction L2 when viewed in the direction in which the opening 12 passes through the base plate 11. The length of the second protrusion 62 along the first direction L1 is greater than the length of the second protrusion 62 along the second direction L2. An end portion 62a of the second protrusion 62 on the other side in the first direction L1 (front end portion 62a) comes into contact with the second cushioning member 52 when the blades 131a moves from the open position to the closed position. In the present embodiment, the front end portion 62a of the second protrusion 62 comes into contact with the second cushioning member 52 when the blade 131a is located in the closed position.

As described above, according to the present embodiment, the blade 131a of the front curtain 130A is provided with the second protrusion 62. Therefore, in a case where the front curtain is moved from the open position to the closed position particularly after image capturing ends in a continuous shooting mode to return to the initial position or in a configuration in which light exposure is performed when the front curtain 130A is moved from the open position to the closed position by using an electromagnetic actuator as a drive source including a rotor, a stator, and a coil as well as the case described above, the second cushioning member 52 can reduce the impact produced when the front curtain 130A, which moves at high speed, stops, and a situation in which a foreign matter produced due to the contact between the second protrusion 62 of the front curtain 130A and the second cushioning member 52 intrudes into the opening 12 of the base plate 11 can be avoided.

Third Embodiment

A focal-plane shutter 210 according to a third embodiment will next be described.

Figure 6:
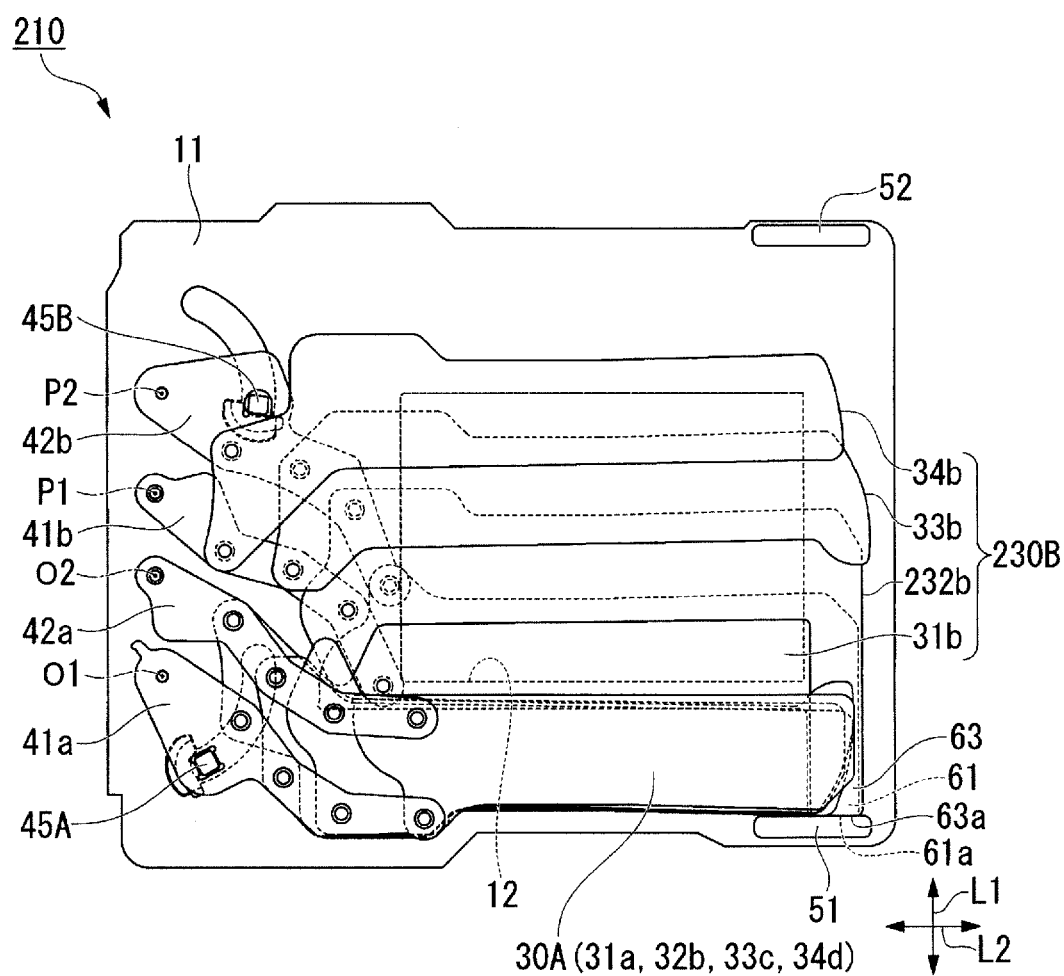
FIG. 6 is a front view of a focal-plane shutter according to a third embodiment and shows a state immediately after light exposure ends.

FIG. 6 is a front view of the focal-plane shutter according to the third embodiment and shows a state immediately after light exposure ends (light exposure end state).

The third embodiment shown in FIG. 6 differs from the first embodiment shown in FIG. 2 in that a blade 232b (second blade) of a rear curtain 230B (curtain) includes a third protrusion 63, which comes into contact with the first cushioning member 51 when the rear curtain 230B unfolds. The same configurations as those in the first embodiment shown in FIG. 2 have the same reference characters and will not be described in detail.

Among the blades 31b, 232b, 33b, and 34b of the rear curtain 230B, the blade 232b is arranged, in a state in which the rear curtain 230B has unfolded, in the second position counted from the downstream side in the direction in which the rear curtain 230B moves when it unfolds, as shown in FIG. 6. Among the blades 31b, 232b, 33b, and 34b of the rear curtain 230B, the blade 232b moves over the second longest distance when the rear curtain 230B unfolds.

The blade 232b has a third protrusion 63, which protrudes from an end portion of the blade 232b on the other side in the second direction L2 (front end portion) toward the one side in the first direction L1. The third protrusion 63 is formed in a rectangular shape. The third protrusion 63 is so formed as to be located outside the opening 12 and shifted from the opening 12 toward the other side in the second direction L2 when viewed in the direction in which the opening 12 passes through the base plate 11. The length of the third protrusion 63 along the first direction L1 is greater than the length of the third protrusion 63 along the second direction L2. An end portion 63a of the third protrusion 63 on the one side in the first direction L1 (front end portion 63a) comes into contact with the first cushioning member S1 when the blades 232b moves from the open position to the closed position. In the present embodiment, the front end portion 63a of the third protrusion 63 comes into contact with the first cushioning member 51 when the blade 232b is located in the closed position.

In a configuration in which the blade 31b comes into contact with the first cushioning member 51, the impact applied to the blade 31b when the rear curtain 230B stops is reduced by the first cushioning member S1. On the other hand, as for the blade 232b, the kinetic energy of which created when the rear curtain 230B moves from the open position to the closed position is smaller than that of the blade 31b but greater than that of the other blades, the impact applied to the blade 232b when the rear curtain 230B stops is not reduced, and the blade 232b is bent in some cases.

According to the present embodiment, in which the blade 232b is provided with the third protrusion 63, the first cushioning member 51 provided in a position separate from the opening 12 of the base plate 11 can reduce the impact applied to the blade 232b when the rear curtain 230B stops. Therefore, the bending of the blade 232b can be avoided, and deterioration of the quality of a captured image can be suppressed.

The blade 31b is provided with the first protrusion 61 in the present embodiment, but the blade 31b is not necessarily provided with the first protrusion 61.

The invention is not limited to the embodiments described above with reference to the drawings, and a variety of variations are conceivable within the technical range of the invention.

For example, in each of the embodiments described above, the first protrusion 61 is configured to come into contact with the first cushioning member 51 when the blade 31b is located in the closed position, but the invention is not necessarily configured this way. The first protrusion 61 may be so arranged that the front end portion 61a of the first protrusion 61 is slightly separate from the first cushioning member 51 in the first direction L1 when the blade 31b is located in the closed position. In this case, when the rear curtain 30B moves from the open position to the closed position, and when the blade 31b overshoots beyond the predetermined closed position, the front end portion 61a of the first protrusion 61 is allowed to come into contact with the first cushioning member 51. The same holds true for the second protrusion 62 and the third protrusion 63.

In each of the embodiments described above, each of the protrusions 61, 62, and 63 is formed in a rectangular shape, but the invention is not necessarily configured this way. The protrusions only need to protrude from the blades 31b, 131a, and 232b along the first direction L1.

Further, in each of the embodiments described above, the protrusions 61, 62, and 63 protrude from the front end portions of the blades 31b, 131a, and 232b, but the invention is not necessarily configured this way. The protrusions 61, 62, and 63 may instead protrude from base end portions of the blades 31b, 131a, and 232b.

In addition to the above, each constituent element in the embodiments described above can be replaced with a known constituent element as appropriate to the extent that the replacement does not depart from the substance of the invention.

What is claimed is:

1. A focal-plane shutter comprising:
   a substrate having an opening;
   a curtain that moves between an open position where the opening is open and a closed position where the opening is closed to allow the opening to be open and closed; and
   a cushioning member that comes into contact with the curtain,
   wherein the curtain has a protrusion that is located outside the opening, protrudes in a first direction from the open position toward the closed position, and comes into contact with the cushioning member when the curtain moves from the open position to the closed position.

2. The focal-plane shutter according to claim 1,
   wherein the curtain includes a front curtain and a rear curtain, and
   the rear curtain is provided with the protrusion.

3. The focal-plane shutter according to claim 2,
   wherein the front curtain comes into contact with the cushioning member when the front curtain moves from the closed position to the open position.

4. The focal-plane shutter according to claim 1,
   wherein the curtain includes a front curtain and a rear curtain, and
   the front curtain is provided with the protrusion.

5. The focal-plane shutter according to claim 1,
   wherein the protrusion is provided at an end portion of the curtain along a second direction perpendicular to the first direction.

6. The focal-plane shutter according to claim 1,
   wherein a length of the protrusion along the first direction is greater than a length of the protrusion along the second direction perpendicular to the first direction.

7. The focal-plane shutter according to claim 1,
   wherein the curtain has a plurality of blades that unfold in the state in which the opening is closed, and
   the protrusion is provided as part of one of the plurality of blades or a first blade that moves over a longest distance when the curtain moves from the open position to the closed position.

8. The focal-plane shutter according to claim 1,
   wherein the curtain has a plurality of blades that unfold in the state in which the opening is closed, and
   the protrusion is provided as part of one of the plurality of blades or a second blade that moves over a second longest distance when the curtain moves from the open position to the closed position.

9. An optical apparatus comprising:
   the focal-plane shutter according to claim 1.

* * * * *